Patented Sept. 6, 1949

2,480,859

UNITED STATES PATENT OFFICE 2,480,859

PREPARATION OF THIOETHER SULFONATES

Charles S. Hollander, Philadelphia, Pa., assignor to Röhm & Haas Company, Philadelphia, Pa., a corporation of Delaware No Drawing. Application April 18, 1947, Serial No. 742,459

6 Claims. (Cl. 260—513)

This invention relates to the preparation of ethyl sulfonate thioethers. It also relates to compounds thus prepared.

It has been proposed to form thioethers by reaction of a metal sulfhydride with a haloethane sulfonate. The product thus obtained is contaminated with the salt formed by metathesis. Furthermore, haloethane sulfonic acid is a troublesome material to make and handle and is, therefore, not a satisfactory raw material.

The difficulties of the prior art methods are avoided by the method of the present invention. Moreover, said method makes possible the production of thioether sulfonates from a great variety of mercaptans, including types of mercaptans not heretofore utilizable by prior processes.

According to this invention, thioether sulfonates are prepared by reacting mercaptans, RSH, which boil above 125° C., at normal pressures and in which the —SH group provides the sole reactive hydrogen, with an alkali metal hydroxyethane sulfonate in the presence of an alkali metal hydroxide as a catalyst. Water is formed and removed during the reaction. The product obtained consists primarily of the thioether sulfonate $RSCH_2CH_2SO_3M$ where R is an organic residue having six or more carbon atoms and M is an alkali metal. These products are useful as wetting, penetrating, emulsifying, dispersing, and cleansing agents. They are useful in the preparation of dye pastes and dispersions of resins. They may be used in solvent systems as dispersants and film-forming agents. Some of the compounds have fungicidal and insecticidal properties which recommend them for these applications.

Thioether sulfonates of considerable present interest are prepared from compounds of the formula RSH in which R is a hydrocarbon group, particularly a hydrocarbon group of 6 to 18 carbon atoms. This group may be an aliphatic hydrocarbon group with straight or branched chain, a cycloaliphatic, an arylaliphatic, or an aryl group. Typical aliphatic thiols include mercaptans having hexyl, heptyl, octyl, nonyl, decyl, undecenyl, dodecyl, cetyl, oleyl, or octadecyl groups. The thiol group may be attached to a primary, secondary, or tertiary carbon atom. The mercaptan need not be a single entity, but may be a mixture of RSH's, as prepared, for example, from olefines resulting from cracking processes. Typical of alicyclic mercaptans are cyclohexyl mercaptan, dicyclopentenyl mercaptan, terpenyl mercaptan, methylcyclohexyl mercaptan, butylcyclohexyl mercaptan, and other sulfhydryl alicyclics. Some examples of the arylaliphatic subclass are benzyl mercaptan, methylbenzyl mercaptan, tert.-butylbenzyl mercaptan, octylbenzyl mercaptan, and the like. Closely related to these thiols are ethers and thioethers, particularly the arylaliphatic compounds in which the aliphatic hydrocarbon chain is interrupted by oxygen or sulfur and which, therefore, yield polyethers. As examples of such arylaliphatic compounds, there may be mentioned phenoxyethyl mercaptan, phenoxypropyl mercaptan, tert.-butylphenoxyethyl mercaptan, heptylphenoxypropyl mercaptan, diisobutyl phenoxyethyl mercaptan, diisobutyl phenyl mercapto-ethyl mercaptan, tert.-amylphenyl mercaptopropyl mercaptan, tert.-butyl phenoxyethoxyethyl mercaptan, butyl phenoxypropoxypropyl mercaptan, octylphenoxyethoxyethoxyethyl mercaptan, diisobutyl phen(oxyethyl)₃oxyethyl mercaptan, or other alkyl phenyl ether or thioether mercaptan having one to four ether linkages. The polyethers derived from these arylaliphatic compounds form a subclass of considerable interest as they have an unusually powerful dispersing action. The aryl mercaptans include not only phenyl mercaptan and alkyl phenyl mercaptans, but also polycyclic sulfhydryl compounds such as alpha- or beta-naphthyl mercaptan and alkyl derivatives thereof. Typical alkyl aryl derivatives are those having one or more methyl substituents or butyl, hexyl, heptyl, octyl, undecyl, or dodecyl groups.

As a catalyst there is used an alkali metal hydroxide. This is used only in small amounts, usually from 0.25% to 5% of the weight of the mercaptan being reacted. Sodium or potassium hydroxide is most commonly used, but these may be replaced, if desired, with one of the other alkali metal hydroxides, such as lithium hydroxide. Usually the alkali metal of the hydroxide is the same as that of the alkali metal isethionate, but this need not necessarily be so.

Sulfhydryl compounds of the types just described are reacted with an alkali metal isethionate by mixing and heating at 130° to 260° C. The reaction may be effected without or with an organic solvent. If an inert organic solvent, such as xylene, cymene, or high-boiling naphtha is used, it serves to help carry off the water of reaction. By condensing and trapping the reflux, the water may be taken off and the solvent returned. Alternatively, the reaction may be effected without solvent. In this case a steam-heated upright condenser may be used to permit water vapor to escape and yet condense and return a high-boiling reactant. The escape of water may be accelerated by passage of a gas over the reacting mixture, preferably a gas such as hydrogen or nitrogen. This also prevents development of dark colors in the product. The reaction mixture is generally heated until water vapor is no longer evolved.

The products obtained vary from thick liquids to solids which are both water-soluble and organic solvent-soluble. They exhibit surface activity.

The following examples will serve as a guide to the practical preparation of the compounds obtained by the process of this invention.

*Example 1*

One hundred fifteen grams of tert.-tetradecyl mercaptan were mixed with 74 grams of sodium isethionate and two grams of powdered caustic soda. The mixture was placed in a 3-neck-flask arranged for mechanical stirring and heated in an oil bath. A slow current of nitrogen was passed over the mixture. At an oil bath temperature of 150° C. water vapors began to appear at the outlet. The temperature of the bath was gradually raised to 200° C. and maintained there for 11 hours. The product was honey-colored, clear and dissolved clear in cold water. It showed remarkable emulsifying power for benzene, toluene, ethylene dichloride, carbon tetrachloride, carbon disulfide, and petroleum ether. It is soluble in most organic solvents. Its water-solutions give the following surface tensions: at 1%, 27.5 dynes/mm.; at 0.1%, 27.7 dynes/mm. Against white oil the interfacial tensions are: at 1%, 2.1; at 0.1%, 2.9. The wetting-out time is 17 seconds at a concentration of 2.5 grams/liter.

*Example 2*

A mixture composed of 155 parts of alpha,-alpha,gamma,gamma-tetramethylbutylphenoxy-ethoxyethyl mercaptan, 74 parts of sodium isethionate, and two parts of powdered caustic soda was treated in essentially the same way as in Example 1. The product is a very viscous translucent soap, which is slowly soluble in water. It is a very efficient detergent. It is soluble in most organic solvents.

*Example 3*

The process is repeated with a mixture of 1005 parts of tert.-dodecyl mercaptan, 740 parts of sodium isethionate, and 20 parts of powdered caustic soda, and the resultant product is a fairly hard, waxy compound which exhibits good surface activity. It is soluble in most organic solvents.

*Example 4*

This experiment was made with a commercial mercaptan from kerosene. The estimation of the thiol group in this compound by iodine titration showed 12.2% of sulfur, while a total sulfur analysis was 13.26%. This is interpreted to mean that the compound has a molecular weight of 270, based on the thiol number. The excess of sulfur is believed to be due to the presence of disulfide and/or sulfide. The mercaptan used has the empirical formula $C_{16}H_{33}SH$.

One hundred grams of this mercaptan was mixed with 55 grams of sodium isethionate and 2.5 grams of powdered caustic soda and then heated under conditions similar to those mentioned above at an oil bath temperature of 198° C. for a total of three hours. The product is a soft, tan-colored soap, clearly soluble in cold water. It proved to be an efficient surface-active compound. The product is soluble in organic solvents.

*Example 5*

There were mixed 67.5 grams of naphthylmercaptan (mixture of alpha and beta) with 62.5 grams of sodium isethionate and two grams of powdered caustic soda and heated under the same conditions as in the previous examples for two hours at an oil bath temperature of 225° C. Then the temperature was raised to 250° C. after adding another gram of caustic soda. At this point the mixture was too stiff for stirring, but heating was continued for a total of five hours. After being cooled the product is a hard, brittle mass. The hydroxyl number showed a conversion of about 70%. It is soluble in water to give a turbid solution, but it is not soluble in the common organic solvents. It shows a fair degree of surface-activity.

*Example 6*

Seventy-three grams of n-octylmercaptan, 74 grams of sodium isethionate, and two grams of powdered caustic soda are placed in a 3-neck-flask equipped with stirrer, steam-cooled reflux condenser, and inlet for slow current of nitrogen. Heat is applied by an oil bath. The reaction begins at about 150° C. The temperature is gradually raised to 188°–190° C. at which it is held for about two hours. The product then is a soft white, flaky solid, clearly soluble in hot water from which it is easily recrystallized. In the purified state the sulfur content is found to be 23.48%. The calculated sulfur content for the compound $C_8H_{17}SC_2H_4SO_3Na$ would be 23.2%. The product obtained gives a water-solution which is clear and colorless and which foams readily.

*Example 7*

Sixty-two grams of benzylmercaptan, 74 grams of sodium isethionate, and two grams of powdered caustic soda are heated in the equipment described for n-octylmercaptan (Example 6). Reaction starts at about 140° C. The temperature is gradually raised to 190°–195° C. The total time of reaction is four hours. A yield of 116 grams (calc. 129 grams) is obtained. This crude product is extracted with 200 cc. of benzene to remove unreacted benzylmercaptan. The residue is recrystallized from water and a little decolorizing carbon. The product consists of colorless, flaky crystals. It is very easily soluble in water and foams readily. The compound contains by analysis 26.15% sulfur while the calculated sulfur content for benzyl thioethyl sodium sulfonate would be 26.6%.

*Example 8*

Seventy-three and one-half grams of p-toluene mercaptan were mixed with 83 grams of sodium isethionate and three grams of powdered caustic soda. The mixture was heated to an oil bath temperature of 200° C. The product is a white, hard mass that cannot be stirred but which, after removal of the unchanged mercaptan by steam distillation, shows that it contains about 43% of sodium p-toluene mercapto ethane sulfonate.

Thus, there may be reacted a mercaptan such as RSH where R is a hydrocarbon group of at least six carbon atoms or an ether, $R'(XR'')_nSH$, where $R'$ represents phenyl or alkyl phenyl groups, or other hydrocarbon-substituted phenyl groups, X is oxygen or sulfur, $R''$ is an alkylene chain of two to three carbon atoms, and $n$ is an integer from one to four. The products obtained are low in inorganic salts and can be separated therefrom usually by solvent extraction to give quite pure materials. The products as obtained or as purified are surface-active and may be used in numerous situations where capillary activity is a requisite. The reaction of a mercaptan, which boils above 125° C., which has reactive hydrogen only in its sulfhydryl group, and which contains at least six carbon atoms, with an alkali metal isethionate, particularly sodium or potassium isethionate, may be represented by the equation.

$$RSH + HOCH_2CH_2SO_3M \rightarrow RSCH_2CH_2SO_3M + H_2O$$

When the sulfhydryl compound is an ether, the reaction may be represented $$R(XR'')_nSH + HOCH_2CH_2SO_3M \rightarrow$$
$$R(XR'')_nSCH_2CH_2SO_3M + H_2O$$

I claim:
1. A process for preparing thioether sulfonates, which comprises reacting by heating together at 130° to 260° C. with evolution of water of reaction a mercaptan which boils above 125° C., which contains reactive hydrogen only in its sulfhydryl group, and which contains at least six carbon atoms, with an alkali metal isethionate,

$$HOCH_2CH_2SO_3M$$

wherein M represents an alkali metal, in the presence of an alkali hydroxide as a catalyst.

2. A process for preparing thioether sulfonates, which comprises reacting by heating together at 130° to 260° C. with separation of water of reaction a mercaptan, RSH, in which R is a hydrocarbon group of at least six carbon atoms, with an alkali metal isethionate, $HOCH_2CH_2SO_3M$, in which M represents an alkali metal, in the presence of an alkali hydroxide as a catalyst.

3. A process for preparing thioether sulfonates, which comprises reacting by heating together at 130° to 260° C. with separation of water of reaction an ether of the formula $$R'(OR'')_nSH$$

wherein R' is a phenyl group, R'' is an alkylene chain of two to three carbon atoms, and $n$ is an integer from one to four, with an alkali metal isethionate, $HOCH_2CH_2SO_3M$, in which M represents an alkali metal, in the presence of an alkali hydroxide as a catalyst.

4. A process for preparing thioether sulfonates, which comprises reacting by heating together at 130° to 260° C. in about molecular proportions an aliphatic mercaptan of six to eighteen carbon atoms and sodium isethionate, $$HOCH_2CH_2SO_3Na$$

in the presence of sodium hydroxide as a catalyst.

5. A process for preparing tetradecyl thioethane sodium sulfonate, which comprises reacting by condensing by heating together at 130° to 260° C. in about molecular proportions tetradecyl mercaptan and sodium isethionate, $$HOCH_2CH_2SO_3Na$$

in the presence of sodium hydroxide as a catalyst.

6. A process for preparing p-diisobutylphenoxyethoxyethane sodium sulfonate, which comprises condensing by heating together at 130° to 260° C. p-diisobutylphenoxyethoxyethyl mercaptan and sodium isethionate, $$HOCH_2CH_2SO_3Na$$

in about molecular proportions in the presence of sodium hydroxide as a catalyst.

CHARLES S. HOLLANDER.

REFERENCES CITED

The following references are of record in the file of this patent:

UNITED STATES PATENTS

| Number | Name | Date |
|---|---|---|
| 1,927,910 | Balle et al. | Sept. 26, 1933 |
| 2,076,875 | Borglin et al. | Apr. 13, 1937 |